G. W. PARKER, Jr.
PORTABLE CONVEYER.
APPLICATION FILED JAN. 15, 1919.
1,321,123.
Patented Nov. 11, 1919.
4 SHEETS—SHEET 1.
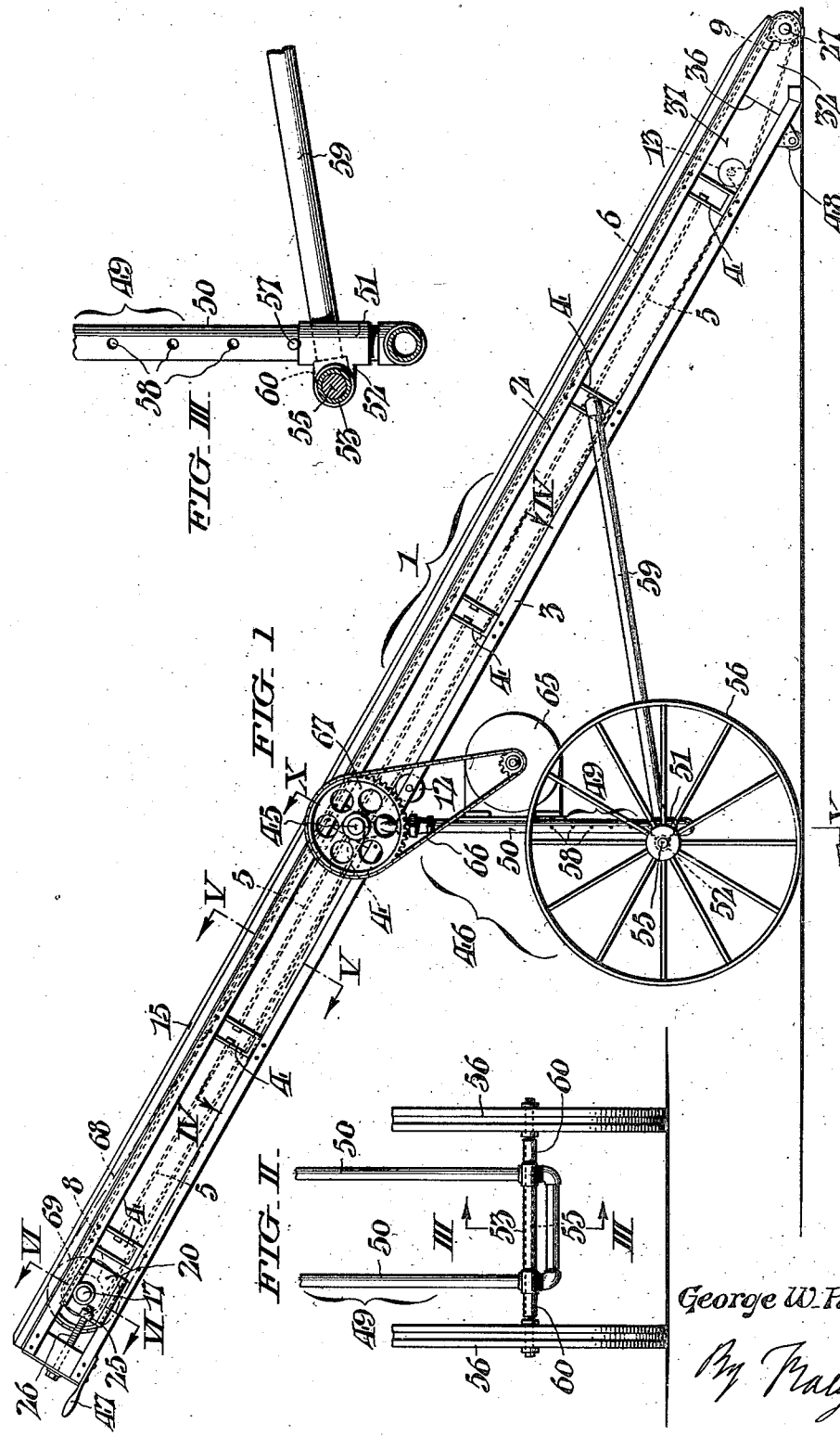
Inventor
George W. Parker, Jr.

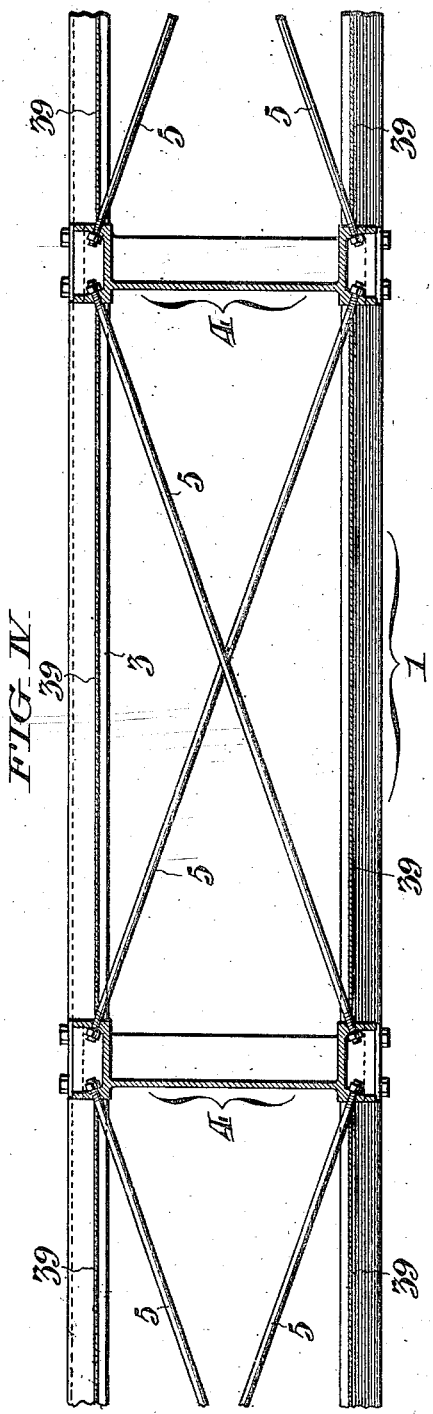
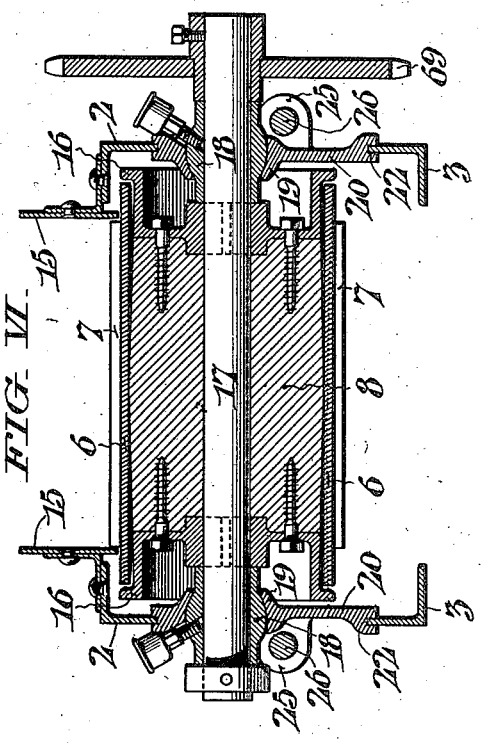
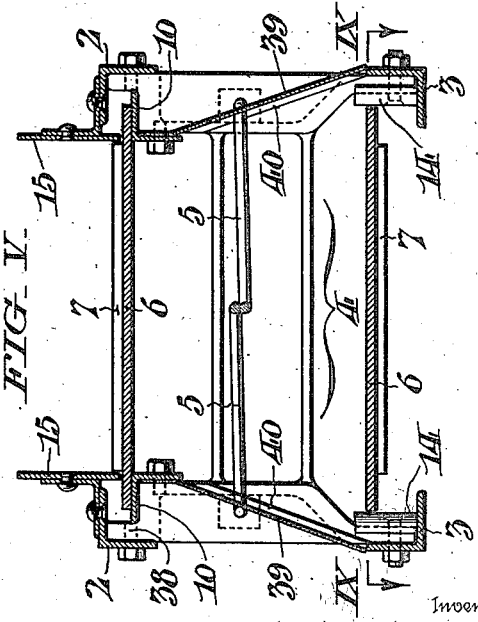

G. W. PARKER, Jr.
PORTABLE CONVEYER.
APPLICATION FILED JAN. 15, 1919.
1,321,123.
Patented Nov. 11, 1919.
4 SHEETS—SHEET 3.
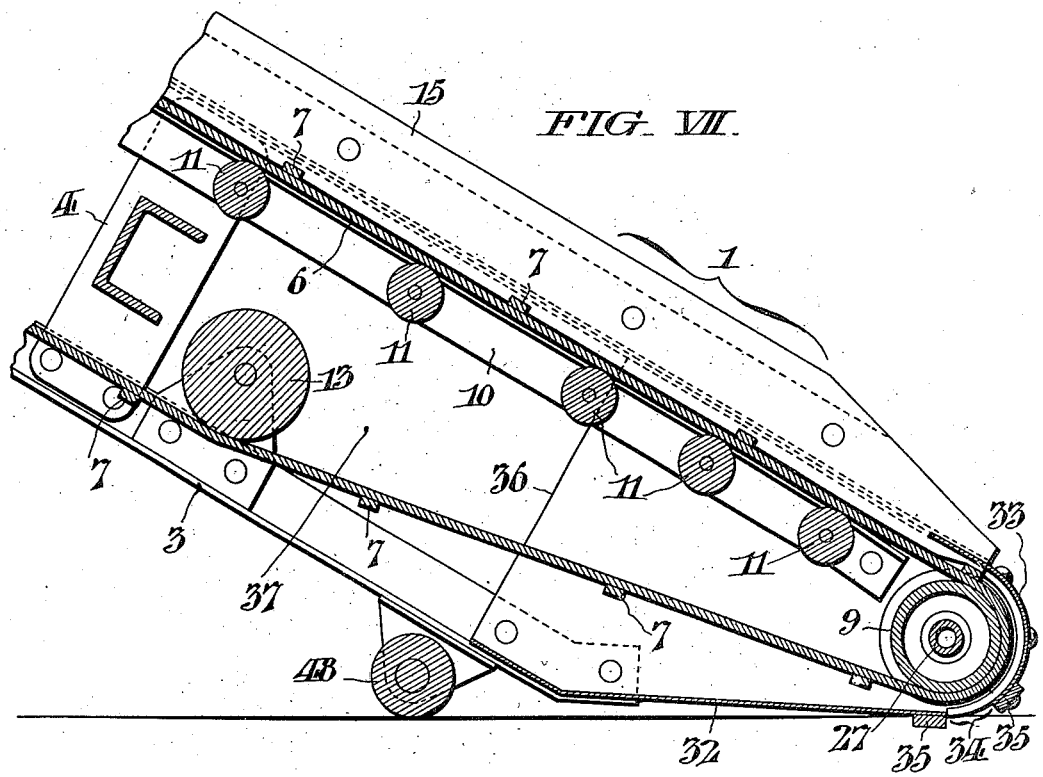
FIG. VII.
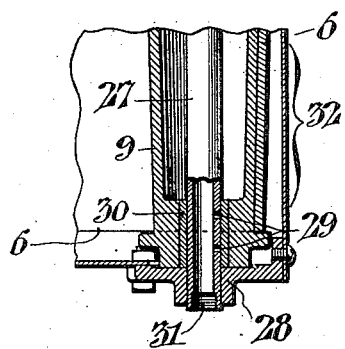
FIG. VIII.
Witnesses
John C. Bergner
James H. Bell
Inventor
George W. Parker, Jr.,
By Maly & Paul,
Attorneys

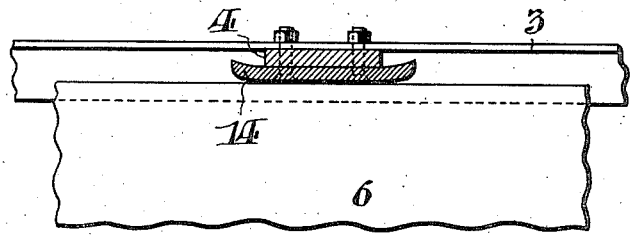
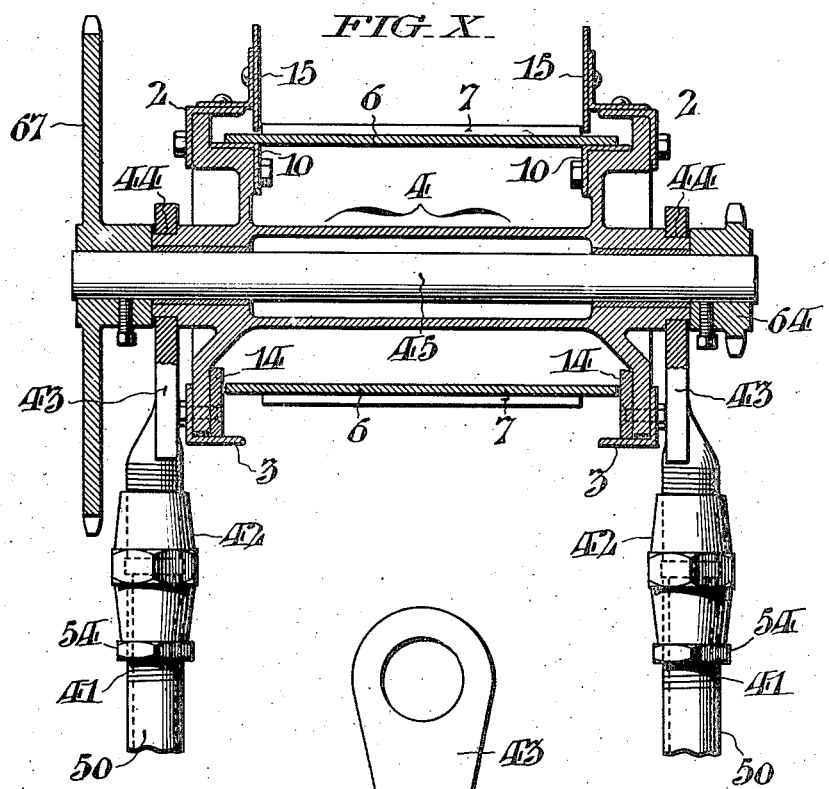
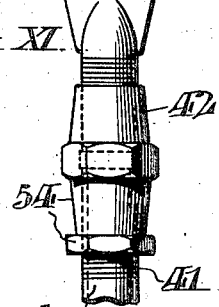

UNITED STATES PATENT OFFICE.

GEORGE W. PARKER, JR., OF PHILADELPHIA, PENNSYLVANIA, ASSIGNOR OF ONE-HALF TO CHARLES G. PFEIFFER, OF PHILADELPHIA, PENNSYLVANIA.

PORTABLE CONVEYER.

1,321,123.  Specification of Letters Patent.  Patented Nov. 11, 1919.

Application filed January 15, 1919. Serial No. 271,193.

*To all whom it may concern:*

Be it known that I, GEORGE W. PARKER, Jr., a resident of the city and county of Philadelphia and State of Pennsylvania, have invented certain new and useful Improvements in Portable Conveyers, whereof the following is a specification, reference being had to the accompanying drawings.

The invention relates to inclined portable conveyers such as are employed in coal yards, quarries, etc., for conveying and elevating coal or broken stone from a pile on the ground level and discharging the same into cars or wagons.

The invention is in part directed to means whereby the inclination of a conveyer of the above type may be varied to facilitate the loading of cars or wagons of varying heights.

The invention also includes a structural housing for the conveyer, embodying certain characteristic details whereby strength and rigidity are obtained in combination with lightness.

The invention is further directed to means for deflecting the spillings of the conveyer laterally beyond the confines of the apparatus to prevent clogging of the movable parts.

The invention also comprehends certain other novel structural details which will become apparent from the description which follows.

In the drawings Figure I is a side eletion of a portable conveyer conveniently illustrating my invention.

Fig. II is a rear elevation of the adjustable wheel supporting structure.

Fig. III is a detail sectional view of the same, on the line III—III of Fig. II.

Fig. IV, is a longitudinal section through the housing frame for the conveyer, the plane of section being indicated by the arrows IV—IV in Fig. I.

Figs. V and VI, are cross sections through the housing frame, as viewed respectively in the direction of the arrows V—V and VI—VI in Fig. I.

Fig. VII, is a longitudinal sectional view of the forward end of the device.

Fig. VIII, is a detail sectional view illustrating the mounting for the idler pulley for the conveyer at the forward end of the machine.

Fig. IX, is a detail sectional view on line IX—IX, of Fig. V, showing one of the replaceable guide shoes for the conveyer belt.

Fig. X, is a cross section through the apparatus along the axis of the driving shaft as observed in the direction of the arrows X—X in Fig. I, and Fig. XI, is an elevation of one of the screw eyes by which the wheel structure is attached to the conveyer housing.

As herein shown, the housing of the conveyer consists of an inclined structural frame 1, comprising four longitudinal angle irons 2,—2, and 3,—3, symmetrically arranged as best seen in the cross section of Fig. V. These angle irons are united at suitable intervals by spacing brackets 4, which are in turn rigidly united by a series of crossed tie rods 5,—5, see Fig. IV. The conveyer proper is in the form of an endless belt 6, preferably of rubber, and its active face is provided with spaced transverse battens 7, functional in preventing retrograde slippage of the conveyed material during elevation. At the upper end of the apparatus, the belt passes about the pulley 8, which serves as a drive therefor, and at the opposite or forward end, said belt runs over an idler pulley 9. Intermediate these pulleys, the edges of the upper or active run of the belt are supported upon the horizontal legs of angle irons 10,—10, running longitudinally of the housing frame and rigidly attached to the spacing brackets 4. Further support for the belt between the angle irons 10, at the forward end of the apparatus is afforded by a series of transverse rollers 11, see Fig. VII. Along its return run, the belt 6, is supported by idler rolls 12, and 13, suitably journaled in the lower part of the frame, replaceable guide shoes 14, bolted to the spacing brackets 4, (Figs. V, IX, and X) being provided to serve as coöperative guides. Along the active portion of its travel, said belt is guarded by side plates 15—15, fixed to the longitudinal angles 2,—2, (Figs. V and VI). Conjointly, the belt and the side plates form a shallow trough within the confines of which the material is guided during its progression therethrough.

The driving pulley 8, is preferably formed of a wooden body, to the ends of which metallic flanges 16,—16, are bolted, as clearly shown in Fig. VI. Said pulley is keyed to a shaft 17, which is journaled at each end in spherical bearings 18,—18, seated in sockets 19,—19, formed in plates 20,—20. These plates are grooved at their upper and lower edges, as indicated respectively at 21,—21, and 22,—22, for sliding engagement with the vertical legs of the frame angles 2,—2, and 3,—3. By this construction, said bearing plates are rendered capable of independent adjustment for varying the tension upon the conveyer, and to this end are provided with laterally projecting ears 25,—25, having threaded engagement with adjusting screws 26,—26.

The idler pulley 9, is adapted to revolve freely upon a hollow axle 27, (Figs. VII and VIII) fixed at its ends in bearing plates 28. In the latter figure, it will be noted that the interior of the axle communicates by means of ducts 29, with bushings 30, at the ends of the pulley. A suitable lubricant may by this means be constantly supplied. The outer ends of the axle are internally threaded as at 31, to receive grease cups or other devices in which an ample supply of lubricant may be stored. The bearing plates 28, are bolted to the side walls of a sheet metal protective casing 32, enveloping the forward end of the machine. Said casing is bent at a comparatively sharp angle and terminates in a rounded end in concentricity with the axis of the pulley 9, as indicated at 33, Fig. VII. A transverse opening 34, extending the full width of the machine, permits the escape of dust and the finer particles of the material dropping from the belt. Influx of any material from without is, however, prevented by guard strips, 35,—35, secured along the edges of the opening. The spaces remaining on either side of the machine between the edges 36, of the side walls of the casing and the first of the spacing brackets 4, may be closed by suitable panels 37, see Figs. I and VII. The closure, thus formed, serves as an efficient protection to prevent clogging of the moving parts at the forward end of the machine, which in active operation, is projected into the pile of the material.

Along the other portions of the run of the conveyer, small particles dropping off its edges escape by way of the interspace 38, between the frame angles 3, and belt supporting angles 10, (Fig. V). Such particles are diverted to the sides of the apparatus by spill fenders 39. These are preferably of sheet metal, and mounted at an inclination upon supporting ledges 40, integrally formed with the transverse spacing brackets 4. The spaces between adjacent pairs of the brackets are entirely closed by the spill fenders so that the return run of the conveyer and other associated moving parts is appropriately protected.

As is best shown in Fig. I, the conveyer housing is pivotally mounted upon a shaft 45, and is supported by a wheel structure comprehensively indicated at 46. The attachment of the wheel structure is such that the forward portion of the device overbalances the rear, and the apparatus normally stabilized at an inclination to the horizontal, as illustrated. The amount of overbalance may, however, be readily overcome by the operative to permit the transfer of the apparatus from place to place, suitable handles 47, being provided at the rear end for the purpose. The forward end of the apparatus is held slightly elevated from the ground and is supported upon a roller 48, suitably journaled to the bottom of the housing.

The inclination of the conveyer may be regulated to facilitate loading vehicles of various heights through the adjustability of certain of the elements incorporated in the traction wheel supporting structure 46, in a manner about to be specifically described.

The main portion of this structure is built up of piping in the form of a U shaped yoke 49, having the upright extremities 50,—50. The upper ends of said extremities are threaded as at 41,—41, (Figs. X and XI), and interposed turn-buckles 42,—42, serve to adjustably connect them with the attachment eyes 43,—43, the latter embracing the reduced portions 44,—44, of the bearings integrally formed with the special spacing bracket 4, in which the shaft 45, is journaled. These eyes are seated against lateral displacement in annular grooves otherwise completed by the hubs of the sprockets 64, and 67. By this arrangement, a local adjustment may be had for purposes which will be later disclosed herein. Associated with each turn-buckle, is a jam nut 54, by which the desired adjustments may be fixed.

Slidably mounted upon the uprights of the yoke are collars 51, having suitable offsets 52, within which is secured a cross pipe 53, adapted to receive the axle 55, for the traction wheels, 56. The position of the sliding sleeves 51, is determined by pins 57, which are registrable with apertures 58, in the uprights of the yoke, as clearly shown in Figs. I, and III. The yoke 50, is rigidly held in a vertical position by side struts 59, each pivotally attached at one end to the conveyer housing and at the other to the wheel axle, as indicated at 60, in Figs. II, and III. As a consequence of this arrangement, these struts automatically assume various angular positions in accommodating the adjustment of the parts of the wheel structure, as above described.

The belt 6, may be driven in any convenient manner, but for most practical purposes, a power drive is desirable. In the present instance, I have indicated diagrammatically an electric motor at 65, (Fig. I), which is secured to the yoke 50, of the wheel supporting structure. Power is transmitted by means of a chain 66, to a sprocket wheel 67, on the shaft 45, already described. The local adjustment of the yoke extremities 50,—50, afforded by the turn-buckles 42,—42, serves to permit compensation for the slack of the driving chain 66. At the opposite side of the machine, motion is transmitted from a sprocket pinion 64, (Fig. X) on the shaft 45, by means of a chain 68, which engages a sprocket 69, fixed upon the shaft 17, of the driving pulley 8, for the belt 6.

From the foregoing, it will be noted that my invention may be readily modified as to details of construction and arrangement without departing from the spirit thereof, I do not, therefore, wish to limit myself to the precise embodiment herein illustrated.

Having thus described my invention, I claim.

1. A portable conveyer consisting of an endless belt; a housing for the said belt; means for varying the inclination of said housing, including a vertical U shaped supporting frame pivotally attached to the said housing; collars slidably mounted upon the uprights of the said frame; an axle carried by said collars; traction wheels mounted upon said axle; means for fixing said collars in adjusted positions; and bracing struts pivoted at one end to the belt housing and at the other to the said axle.

2. A portable conveyer consisting of an endless belt; a housing for the said belt; a driving shaft journaled at a point intermediate the ends of the housing; means for varying the inclination of the said housing, including a supporting frame with driving means for the belt mounted thereon and operatively connected to said shaft pivotally attached to the said housing about the axis of said driving shaft so as to permit variation in the angular relation of said frame and said housing without disturbance of the driving connection, so as to swing thereabout with reference to said housing in the variation of its inclination as aforesaid; and traction wheels adjustably secured to the said frame.

3. A portable conveyer consisting of an endless belt; a supporting housing for the said belt including a group of symmetrically arranged longitudinally running angle irons; a driving pulley and an idler pulley for said belt; journals for said driving pulley including spherical bearings for the pulley shaft; socket plates for the said spherical bearings, said plates being grooved for slidable engagement with the frame angles; and adjusting means for shifting said socket plates, to vary the tension on the belt.

4. A portable conveyer consisting of an endless belt; a housing for the said belt; a driving shaft journaled intermediate the ends of the housing; a U-shaped supporting frame for the said housing; a motor fixed to said frame and chain connected to said driving shaft; terminal eyes attached to the ends of the uprights of said frame and adapted to embrace the journal bearings of the driving shaft in co-axial relation with said shaft so as to permit relative swinging of frame and housing in variation of the inclination of the latter in normal use; and turn-buckles for adjusting the slack of the driving chain.

5. In a portable conveyer, the combination of an endless belt and a housing therefor; a driving shaft journaled at a point intermediate the ends of said housing; a vertical supporting frame pivotally attached to said housing coaxially with said shaft; a motor fixed to said frame and chain connected to said shaft; collars slidable and adjustable along the uprights of said frame and carrying traction wheels; and bracing struts pivotally connected between said frame and said collars.

In testimony whereof I have hereunto signed my name at Philadelphia, Pennsylvania, this tenth day of January, 1919.

GEORGE W. PARKER, Jr.

Witnesses:
JAMES H. BELL,
E. L. FULLERTON.